United States Patent
Li et al.

(10) Patent No.: US 11,152,853 B2
(45) Date of Patent: Oct. 19, 2021

(54) POWER DEVICE INCLUDING PARALLEL POWER CONVERSION MODULES AND CASCADED POWER CONVERSION UNITS

(71) Applicant: Delta Electronics (Shanghai) Co., Ltd., Shanghai (CN)

(72) Inventors: Ming Li, Shanghai (CN); Yiqing Ye, Shanghai (CN); Chengshang Yang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/527,881

(22) Filed: Jul. 31, 2019

(65) Prior Publication Data
US 2020/0153331 A1    May 14, 2020

(30) Foreign Application Priority Data
Nov. 12, 2018   (CN) .......................... 201811338925.1

(51) Int. Cl.
*H02M 3/07*    (2006.01)
*H02M 1/00*    (2006.01)

(52) U.S. Cl.
CPC .............. *H02M 3/07* (2013.01); *H02M 1/007* (2021.05); *H02M 1/0074* (2021.05); *H02M 1/0093* (2021.05)

(58) Field of Classification Search
CPC ........... H02M 3/07; H02M 2001/0074; H02M 2001/0093; H02M 3/155; H02M 3/158; H02M 3/1584
See application file for complete search history.

(56) References Cited

U.S. PATENT DOCUMENTS

| | | | |
|---|---|---|---|
| 7,872,886 B2 | 1/2011 | Xu et al. | |
| 9,006,930 B2 * | 4/2015 | Jang | H02J 4/00 307/82 |

(Continued)

FOREIGN PATENT DOCUMENTS

| | | |
|---|---|---|
| CN | 102185493 A | 9/2011 |
| CN | 107546959 A | 1/2018 |
| CN | 108539981 A | 9/2018 |

OTHER PUBLICATIONS

Jiang, Shuai et al., Switched Tank Converters, IEEE Xplore, 2018, pp. 81-90.

*Primary Examiner* — Kyle J Moody
*Assistant Examiner* — Jye-June Lee
(74) *Attorney, Agent, or Firm* — Kirton McConkie; Evan R. Witt

(57) ABSTRACT

A power device includes a first conversion module and a second conversion module. The first conversion module includes a first conversion unit and receives a first divided voltage of a bus voltage. The second conversion module includes a cascade conversion circuit with a second conversion unit and a third conversion unit. The input terminal of the second conversion module and the input terminal of the first conversion module are connected with each other in series. The input terminal of the second conversion module receives a second divided voltage of the bus voltage. The output terminal of the second conversion module and the output terminal of the first conversion module are electrically connected with each other in parallel so as to provide an output voltage to a load. The third conversion unit detects the output voltage to control the output voltage stable.

19 Claims, 13 Drawing Sheets

(56) References Cited

U.S. PATENT DOCUMENTS

| | | | |
|---|---|---|---|
| 9,966,842 B1* | 5/2018 | Jiang | H02J 1/102 |
| 2009/0206804 A1* | 8/2009 | Xu | H02M 3/1584 |
| | | | 323/234 |
| 2009/0278520 A1* | 11/2009 | Perreault | H02M 3/07 |
| | | | 323/282 |
| 2011/0018511 A1* | 1/2011 | Carpenter | H02M 3/158 |
| | | | 323/282 |
| 2017/0288533 A1* | 10/2017 | Sandusky | H02M 3/156 |
| 2018/0183347 A1* | 6/2018 | Ye | H02M 1/08 |

* cited by examiner

POWER DEVICE INCLUDING PARALLEL POWER CONVERSION MODULES AND CASCADED POWER CONVERSION UNITS

FIELD OF THE INVENTION

The present invention relates to a power device, and more particularly to a power device with higher efficiency.

BACKGROUND OF THE INVENTION

With the continuous expansion of the data center market of the global Internet, the amount of the electric power supplied to the data center is increased sharply, and requirements for power supply on the processor of the data center are getting higher. Therefore, a high-performance power system is usually required to power the data center.

The power system usually has a cascade power structure including a front-stage conversion module and a rear-stage conversion module. The input terminal of the front-stage conversion module is electrically connected with a DC distribution bus. The input terminal of the rear-stage conversion module is electrically connected with the output terminal of the front-stage conversion module. The output terminal of the rear-stage conversion module is electrically connected with a load. The efficiency of the cascade power structure is equal to the product of the efficiency of the front-stage conversion module and the efficiency of the rear-stage conversion module. Since the efficiency of the cascade power structure is always lower than the efficiency of the front-stage conversion module and the efficiency of the rear-stage conversion module, so the overall efficiency of the cascade power structure is low.

A quasi-parallel-connected power structure is another kind of high-efficiency power system. The quasi-parallel-connected power structure comprises a first conversion module and a second conversion module. The input terminal of the first conversion module and the input terminal of the second conversion module are connected with each other in series and electrically connected with a DC distribution bus. The bus voltage from the DC distribution bus is divided into a first divided voltage and a second divided voltage. The first conversion module receives the first divided voltage of the bus voltage. The second conversion module receives the second divided voltage of the bus voltage. The output terminal of the first conversion module and the output terminal of the second conversion module are connected with each other in parallel and electrically connected with a load. The overall efficiency of the quasi-parallel-connected power structure is determined according to the efficiency of the first conversion module and the efficiency of the second conversion module. For example, the efficiency of the quasi-parallel-connected power structure may be expressed as:

$$\frac{U_1}{U_1+U_2}\eta_1 + \frac{U_2}{U_1+U_2}\eta_2 \quad (1)$$

In the above formula, U1 is the first divided voltage, U2 is the second divided voltage, $\eta_1$ is the efficiency of the first conversion module, and $\eta_2$ is the efficiency of the second conversion module. In other words, the efficiency of the quasi-parallel-connected power structure is between the efficiency of the first conversion module and the efficiency of the second conversion module. In principle, the efficiency of the quasi-parallel-connected power structure is higher than the efficiency of the cascade power structure.

In the quasi-parallel-connected power structure, the first conversion module is usually a resonant-type DC/DC converter, and the second conversion module is a single buck converter. The ratio of the input voltage to the output voltage of the resonant-type DC/DC converter is fixed. Since the resonant-type DC/DC converter and the buck converter have respective circuitry characteristics, the efficiency $\eta_1$ of the first conversion module is higher than the efficiency $\eta_2$ of the second conversion module. Wherein the ratio of the first conversion module is fixed, the second divided voltage received by the first conversion module is substantially fixed, however the voltage range of the DC distribution bus is large, so the voltage fluctuation of the DC distribution bus mainly results in the fluctuation of the second divided voltage. Generally, according to the characteristics of the buck circuit, with increasing of the voltage received by the buck circuit of the second conversion module, the efficiency of the buck circuit of the second conversion module is decreased. As the voltage of the DC distribution bus is increased, the second divided voltage is increased and the efficiency of the second conversion module is decreased. According to the above formula (1), the overall efficiency of the quasi-parallel-connected power structure is decreased. As mentioned above, the efficiency of the quasi-parallel-connected power structure is higher than the efficiency of the cascade power structure. However, as the voltage of the DC distribution bus is increased, the efficiency of the quasi-parallel-connected power structure is decreased.

Therefore, there is a need of providing an improved power device so as to overcome the drawbacks of the conventional technologies.

SUMMARY OF THE INVENTION

An object of the present invention provides a power device with higher efficiency.

In accordance with an aspect of the present invention, a power device is provided. The power device receives a bus voltage and provides an output voltage to a load. The power device includes a first conversion module and a second conversion module. The first conversion module includes an input terminal, an output terminal and at least a first conversion unit. The first conversion unit receives a first divided voltage of the bus voltage. The second conversion module includes an input terminal, an output terminal and a cascade conversion circuit with at least one second conversion unit and at least one third conversion unit. The input terminal of the second conversion module and the input terminal of the first conversion module are connected with each other in series. The input terminal of the second conversion module receives a second divided voltage of the bus voltage. The output terminal of the second conversion module and the output terminal of the first conversion module are electrically connected with each other in parallel so as to provide the output voltage to the load. The third conversion unit detects the output voltage in real time to control the output voltage stable.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
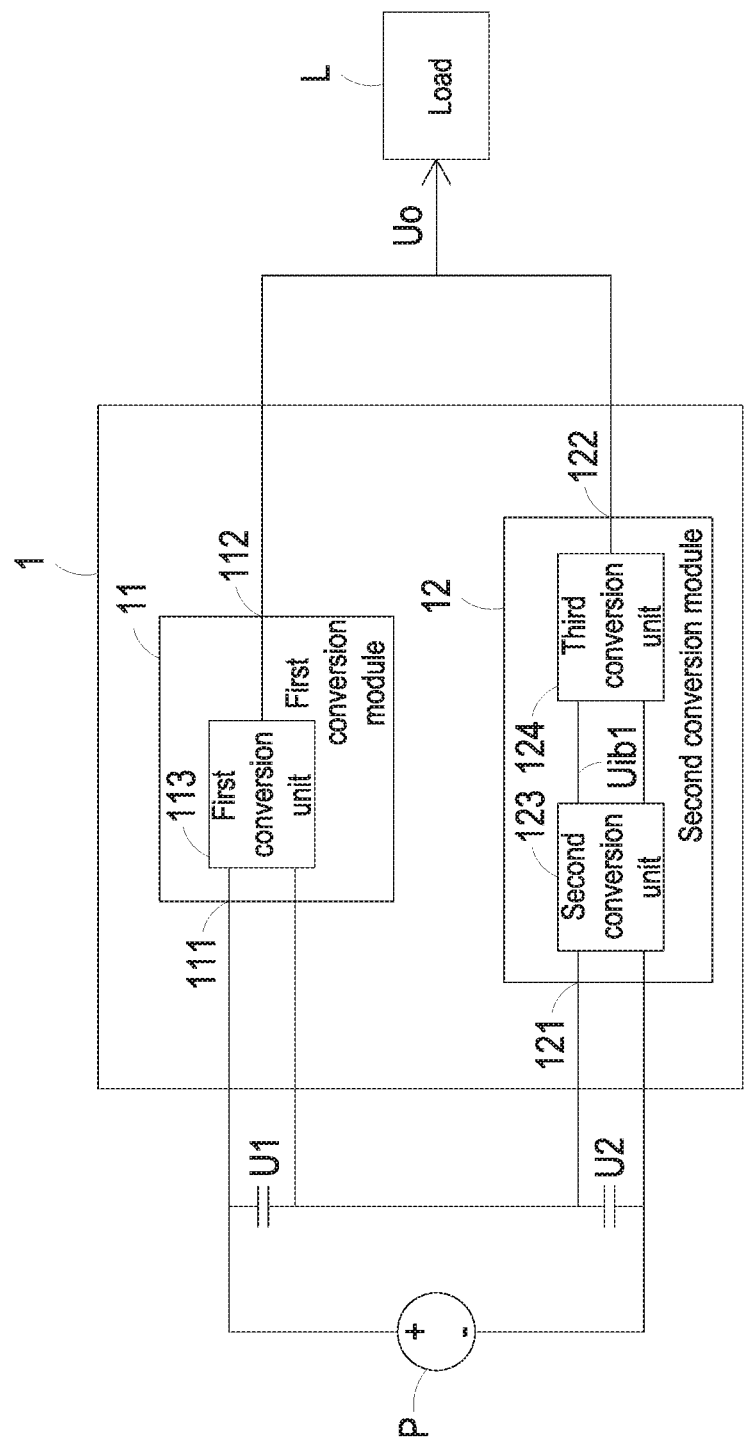
FIG. 1 is a schematic circuit diagram illustrating a power device according to a first embodiment of the present invention.

FIG. 1 is a schematic circuit diagram illustrating a power device according to a first embodiment of the present invention. The power device 1 is electrically connected between a power source P and a load L. For example, the power source P is a DC distribution bus. By the power device 1, a bus voltage from the power source P is converted into an output voltage Uo for powering the load L. The power device 1 comprises a first conversion module 11 and a second conversion module 12. The bus voltage from the power source P is subjected to a voltage division. Consequently, the bus voltage from the power source P is divided into a first divided voltage U1 and a second divided voltage U2. The first divided voltage U1 is provided to the first conversion module 11. The second divided voltage U2 is provided to the second conversion module 12.

The first conversion module 11 comprises an input terminal 111, an output terminal 112 and at least a first conversion unit 113. The input terminal 111 of the first conversion module 11 is electrically connected with the power source P to receive and convert the first divided voltage U1 of the bus voltage from the power source P. The output terminal 112 of the first conversion module 11 is electrically connected with the load L. The ratio of the input voltage to the output voltage of the first conversion unit 113 is fixed. That is, the output voltage of the first conversion unit 113 changes with the input voltage of the first conversion unit 113, and the ratio of the input voltage to the output voltage is fixed. The characteristics of the first conversion unit 113 are similar to the characteristics of a transformer. Moreover, for example, the first conversion unit 113 comprises a LLC DC transformer, a phase-shifted full-bridge DC converter, a buck/boost transformer or plural parallel-connected DC transformers.

The second conversion module 12 comprises an input terminal 121, an output terminal 122 and at least one cascade conversion circuit. The cascade conversion circuit comprises a second conversion unit 123 and a third conversion unit 124. The input terminal 121 of the second conversion module 12 is connected with the input terminal 111 of the first conversion module 11 in series. In addition, the input terminal 121 of the second conversion module 12 is electrically connected with the power source P to receive the second divided voltage U2 of the bus voltage. The output terminal 122 of the second conversion module 12 and the output terminal 112 of the first conversion module 11 are electrically connected with each other in parallel so as to provide the output voltage Uo to the load L. In this embodiment, the second conversion unit 123 is electrically connected with the input terminal 121 of the second conversion module 12 to receive the second divided voltage U2 of the bus voltage from the power source P. By the second conversion unit 123, the second divided voltage U2 is converted into a first intermediate voltage Uib1. The third conversion unit 124 and the second conversion unit 123 are connected with each other in cascade. The third conversion unit 124 receives the first intermediate voltage Uib1 from the second conversion unit 123. By the third conversion unit 124, the first intermediate voltage Uib1 is converted into the output voltage Uo. During normal operation the third conversion unit 124 detects the output voltage Uo in real time. According to the output voltage Uo, the duty cycle of the switches in the third conversion unit 124 is controlled. Consequently, the magnitude of the output voltage Uo is stably maintained at a proper voltage level. Moreover, for example, the third conversion unit 124 comprises a single buck converter or plural parallel-connected buck converters.

As mentioned above, the second divided voltage U2 is converted into the first intermediate voltage Uib1 by the second conversion unit 123. In accordance with a feature of the present invention, the ratio of the second divided voltage U2 to the first intermediate voltage Uib1 is adjustable. As the second divided voltage U2 is increased or decreased, the ratio of the second divided voltage U2 to the first intermediate voltage Uib1 is correspondingly adjusted. Consequently, the magnitude of the first intermediate voltage Uib1 is limited to be within a predetermined voltage range. In other words, the magnitude of the first intermediate voltage Uib1 to be received by the third conversion unit 124 is not obviously fluctuated with the increase or decrease of the second divided voltage U2. Consequently, the third conversion unit 124 can achieve high efficiency. In addition, the efficiency of the overall second conversion module 12 is not decreased with the increase of the second divided voltage U2. As previously described, the efficiency of the second conversion module of the conventional quasi-parallel-connected power device is decreased with the increase of the received voltage, and the overall efficiency of the power device is decreased. In accordance with the present invention, the overall efficiency of the power device 1 is also kept high when the bus voltage from the power source P is subjected to fluctuation.

According to one aspect of the present invention, the ratio of the input voltage to the output voltage of the second conversion unit 123 is adjustable. As shown in FIG. 1, the second divided voltage U2 and the first intermediate voltage Uib1 are the input voltage and the output voltage of the second conversion unit 123, respectively. That is, the ratio of the second divided voltage U2 to the first intermediate voltage Uib1 is adjustable. In such way, the magnitude of the first intermediate voltage Uib1 is limited to be within a predetermined voltage range between the minimum voltage value and the maximum voltage value. Since the magnitude of the first intermediate voltage Uib1 is limited to be lower than the maximum voltage value, the cost-effective electronic components (e.g., MOSFET transistors) capable of withstanding the lower voltage can be used in the third conversion unit 124. Consequently, the second conversion module 12 and the power device 1 may achieve higher efficiency. Since the magnitude of the first intermediate voltage Uib1 is limited to be higher than the minimum voltage value, the first intermediate voltage Uib1 is not lower than the threshold voltage of the under voltage-lockout (UVLO) function. In other words, the UVLO function forces the power off when the first intermediate voltage Uib1 is lower than the default voltage of the under voltage-lockout (UVLO) function. So the safety and the stability of the power device 1 are enhanced in operation.

In an embodiment, the ratio of the input voltage to the output voltage of the second conversion unit 123 is adjusted according to the bus voltage. In another embodiment, the ratio of the input voltage to the output voltage of the second conversion unit 123 is adjusted according to the second divided voltage U2 of the bus voltage.

The connection relationship between the second conversion unit 123 and the third conversion unit 124 of the second conversion module 12 is not restricted to that of FIG. 1.

Figure 2:
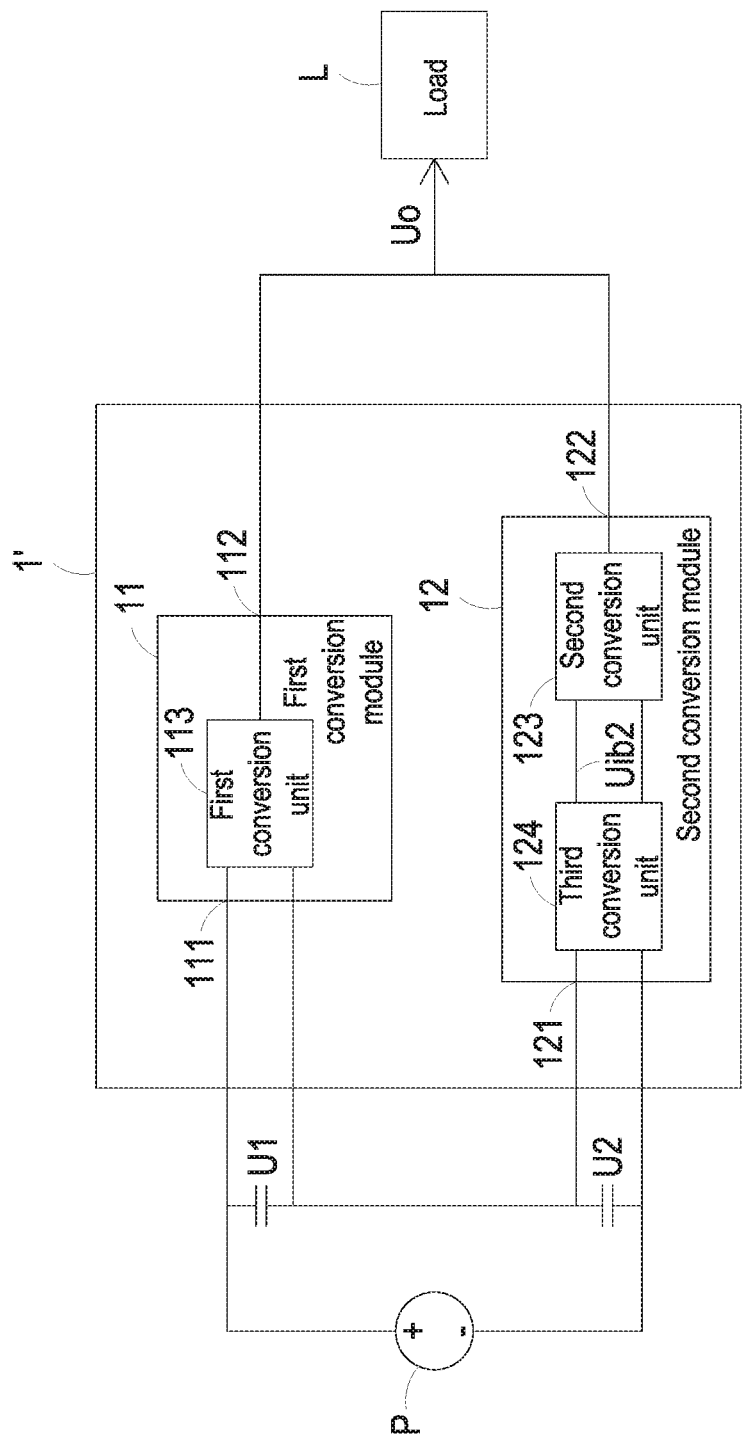
FIG. 2 is a schematic circuit diagram illustrating a power device according to a second embodiment of the present invention.

FIG. 2 is a schematic circuit diagram illustrating a power device according to a second embodiment of the present invention. Component parts and elements corresponding to those of the first embodiment are designated by identical numeral references, and detailed descriptions thereof are omitted. As shown in FIG. 2, the third conversion unit 124 is electrically connected with the input terminal 121 of the second conversion module 12. In addition, the input terminal 121 of the second conversion module 12 is electrically connected with the power source P to receive the second divided voltage U2. By the third conversion unit 124, the second divided voltage U2 is converted into a second intermediate voltage Uib2. The output terminal of the second conversion unit 123 is electrically connected with the output terminal 122 of the second conversion module 12. The input terminal of the second conversion unit 123 is electrically connected with the output terminal of the third conversion unit 124. By the second conversion unit 123, the second intermediate voltage Uib2 from the third conversion unit 124 is converted into the output voltage Uo. In this embodiment, the second intermediate voltage Uib2 and the output voltage Uo are the input voltage and the output voltage of the second conversion unit 123, respectively. The purpose of the power device 1 of this embodiment is similar to that of the first embodiment, and is not redundantly described herein.

Figure 3:
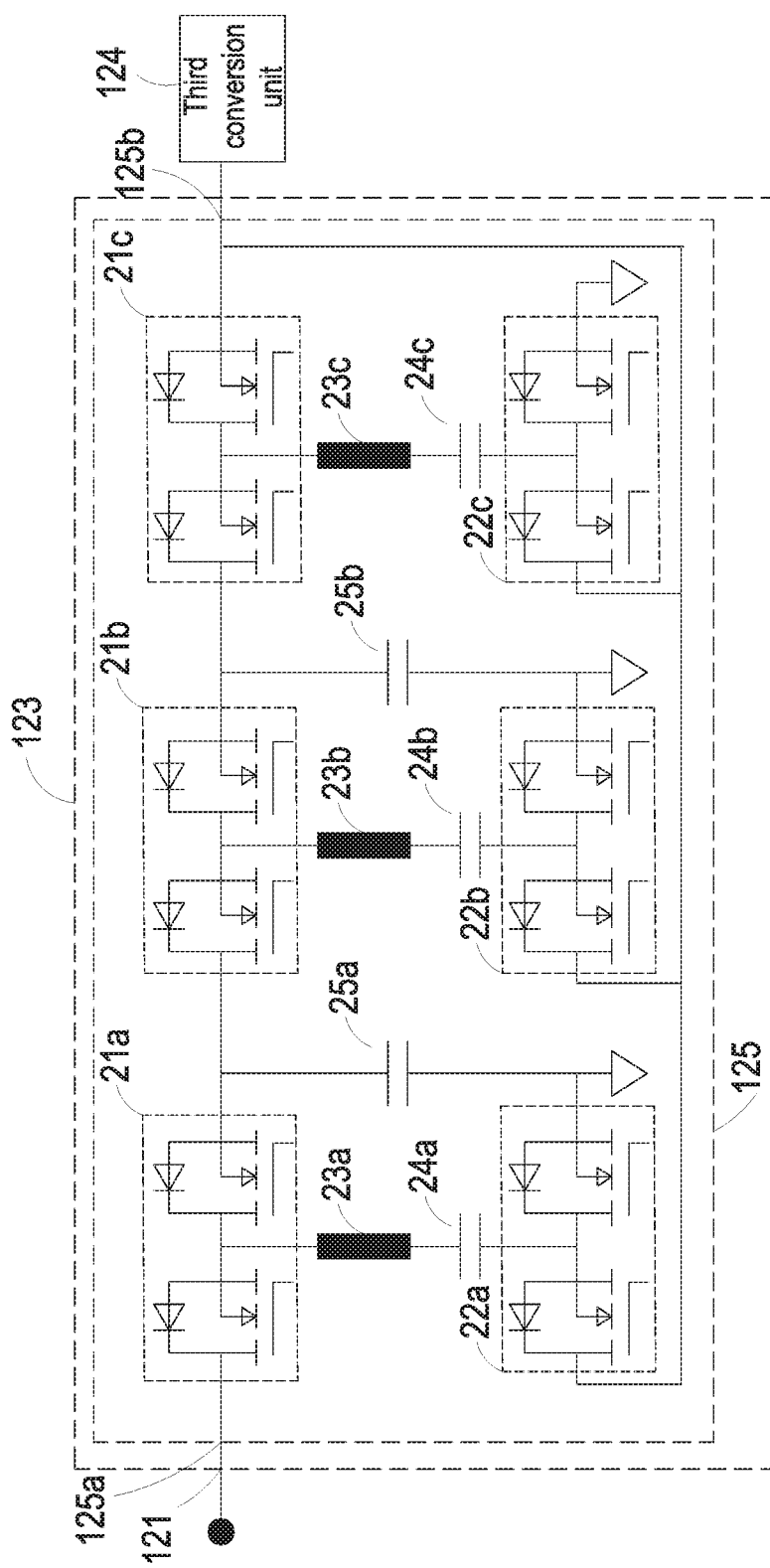
FIG. 3 is a schematic circuit diagram illustrating an exemplary second conversion unit with a single type DC/DC switching conversion circuit.

FIG. 3 is a schematic circuit diagram illustrating an exemplary second conversion unit with a single type DC/DC switching conversion circuit. In this embodiment, the second conversion unit 123 comprises a single type DC/DC switching conversion circuit 125. For example, the DC/DC switching conversion circuit 125 is a switching tank converter DC-DC transformer (STC-DCX) circuit. The DC/DC switching conversion circuit 125 comprises an input terminal 125a, an output terminal 125b, three first switch groups 21a, 21b, 21c, three second switch groups 22a, 22b, 22c, three inductors 23a, 23b, 23c, three first capacitors 24a, 24b, 24c and two second capacitors 25a, 25b. A first terminal of the first switch group 21a is electrically connected with the input terminal 125a. A first terminal of the first switch group 21b is electrically connected with a second terminal of the first switch group 21a. A first terminal of the first switch group 21c is electrically connected with a second terminal of the first switch group 21b. A second terminal of the first switch group 21c is electrically connected with the output terminal 125b. A first terminal of the second switch group 22a, a first terminal of the second switch group 22b and a first terminal of the second switch group 22c are electrically connected with the output terminal 125b. A second terminal of the second switch group 22a, a second terminal of the second switch group 22b and a second terminal of the second switch group 22c are electrically connected with a ground terminal. The inductor 23a and the first capacitor 24a are serially connected between the middle point of the first switch group 21a and the middle point of the second switch group 22a. The inductor 23b and the first capacitor 24b are serially connected between the middle point of the first switch group 21b and the middle point of the second switch group 22b. The inductor 23c and the first capacitor 24c are serially connected between the middle point of the first switch group 21c and the middle point of the second switch group 22c. The second capacitor 25a is electrically connected between the second terminal of the first switch group 21a and the second terminal of the second switch group 22a. The second capacitor 25b is electrically connected between the second terminal of the first switch group 21b and the second terminal of the second switch group 22b. In an embodiment, the ratio of the input voltage to the output voltage of the DC/DC switching-type conversion circuit 125 is 4:1. It is noted that the number of the first switch groups and the number of the second switch groups are not restricted. By controlling the on/off states of the switches of the switch groups, the ratio of the input voltage to the output voltage can be adjusted.

Figure 4A:
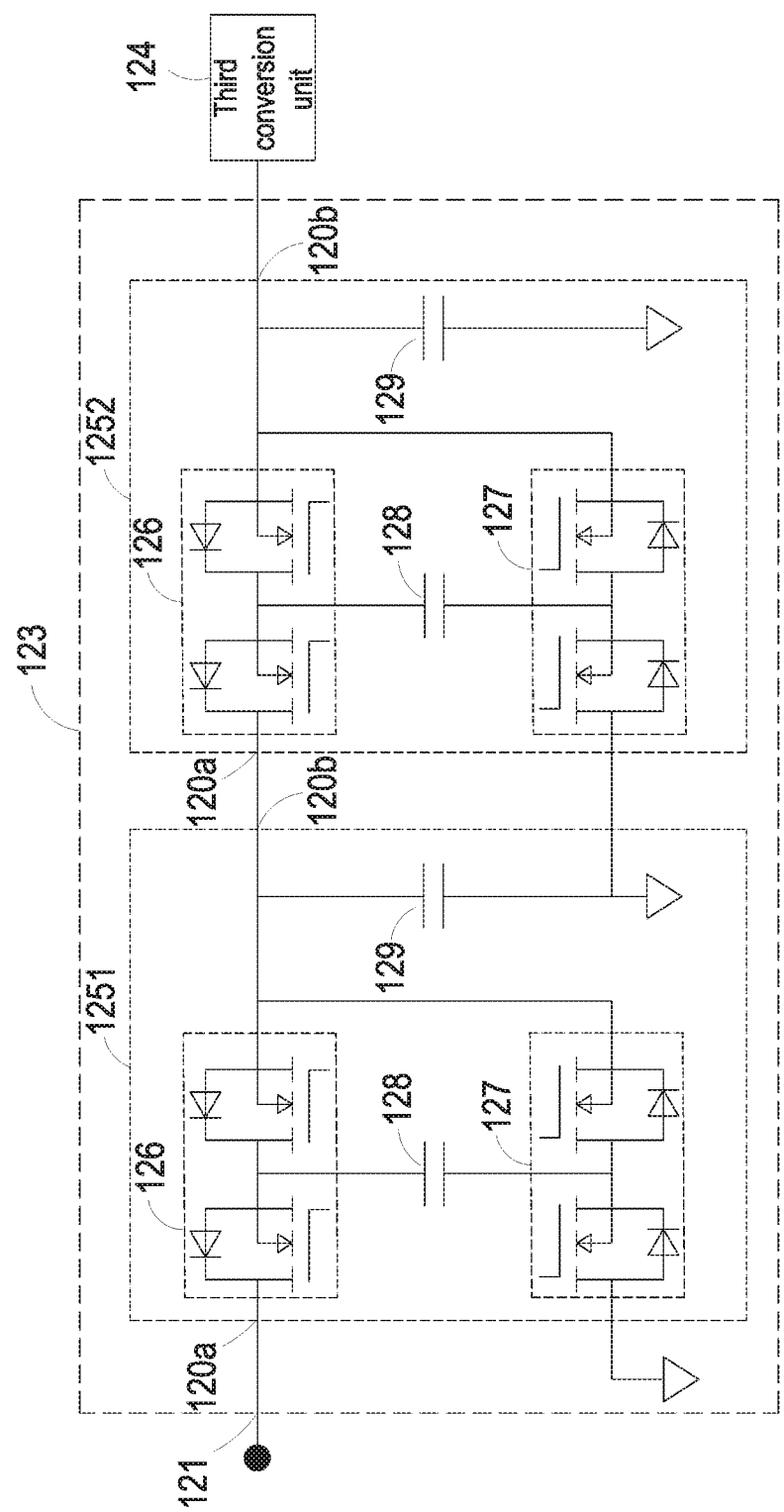
FIG. 4A is a schematic circuit diagram illustrating an exemplary second conversion unit with plural DC/DC switching conversion circuits.

In some embodiments, the second conversion unit 123 comprises plural DC/DC switching conversion circuits in cascade connection. FIG. 4A is a schematic circuit diagram illustrating an exemplary second conversion unit with plural DC/DC switching conversion circuits. In this embodiment, the second conversion unit 123 comprises a first DC/DC switching conversion circuit 1251 and a second DC/DC switching conversion circuit 1252 in cascade connection. For example, the DC/DC switching conversion circuits 1251 and 1252 are switching capacitor DC-DC transformer (SC-DCX) circuits. In this embodiment, the ratio of the input voltage to the output voltage of the second conversion unit 123 is the product of the ratio of the input voltage to the output voltage of the first DC/DC switching conversion circuit 1251 and the ratio of the input voltage to the output voltage of the second DC/DC switching conversion circuit 1252.

The first DC/DC switching conversion circuit 1251 and the second DC/DC switching conversion circuit 1252 are connected with each other in cascade connection sequentially. Each of the DC/DC switching conversion circuits 1251 and 1252 comprises an input terminal 120a, an output terminal 120b, a first switching circuit 126, a second switching circuit 127, a first capacitor 128 and a second capacitor 129. The output terminal 120b of the first DC/DC switching conversion circuit 1251 is electrically connected with the input terminal 120a of the second DC/DC switching conversion circuit 1252. The first terminal of the first switching circuit 126 is electrically connected with the corresponding input terminal 120a. The first terminal of the second switching circuit 127 is electrically connected with the ground terminal. The first capacitor 128 is electrically connected between the middle point of the corresponding first switching circuit 126 and the middle point of the corresponding second switching circuit 127. The first terminal of the second capacitor 129, the second terminal of the first switching circuit 126 and the second terminal of the second switching circuit 127 are electrically connected with the output terminal 120b. The second terminal of the second capacitor 129 is electrically connected with the ground terminal. In an embodiment, the ratio of the input voltage to the output voltage of the second conversion unit 123 is 4:1.

In some embodiments, one of the first switching circuit 126 and the second switching circuit 127 of at least one specified DC/DC switching conversion circuit is selectively turned on or turned off. Since the at least one specified DC/DC switching conversion circuit is bypassed, the ratio of the input voltage to the output voltage of the second conversion unit 123 is adjustable. Two examples will be described in FIGS. 4B and 4C.

Figure 4B:
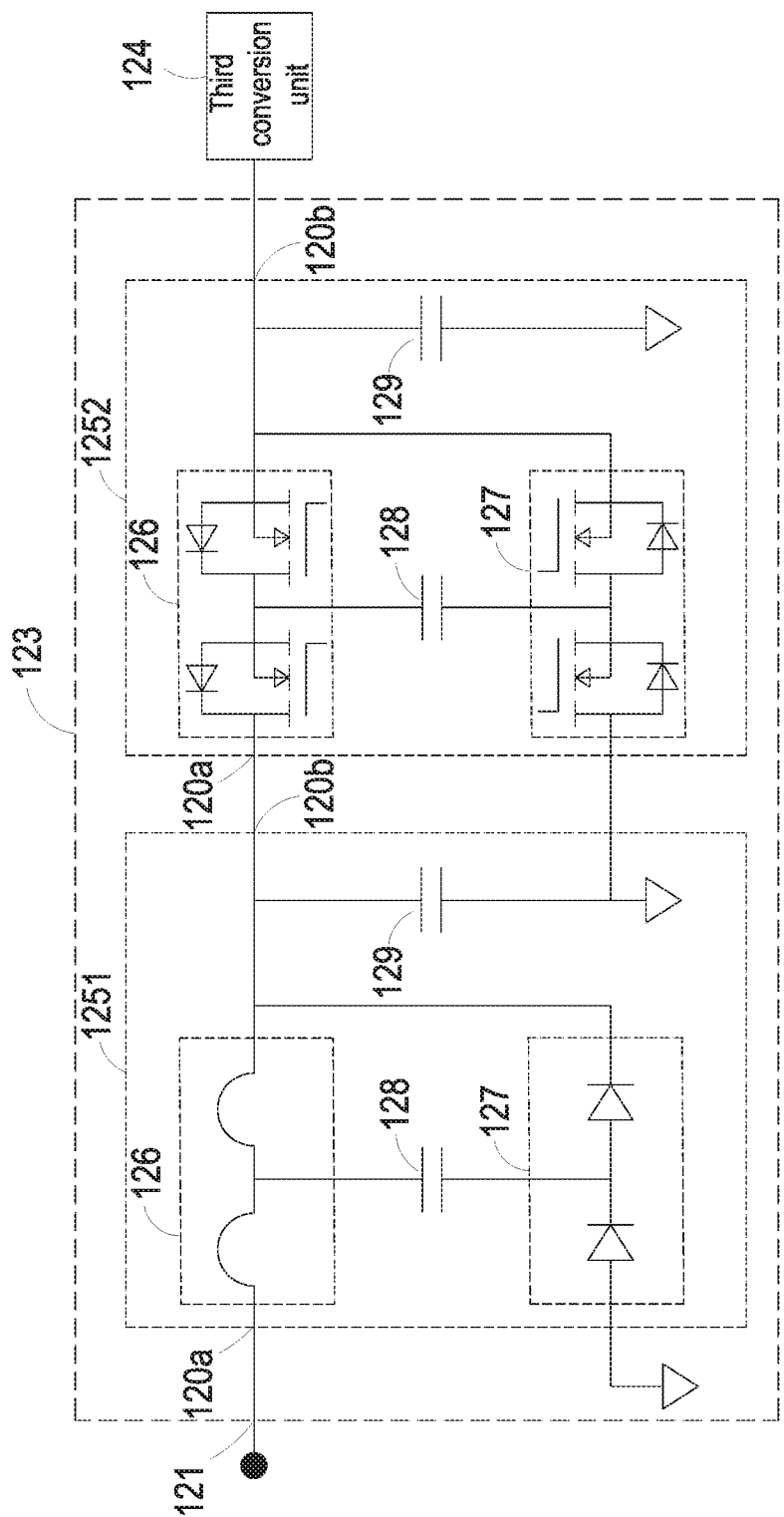
FIG. 4B is a schematic circuit diagram illustrating the second conversion unit as shown in FIG. 4A, in which the ratio of the input voltage to the output voltage of the second conversion unit is 2:1.

FIG. 4B is a schematic circuit diagram illustrating the second conversion unit as shown in FIG. 4A, in which the ratio of the input voltage to the output voltage of the second conversion unit is 2:1. The circuitry of the second conversion unit 123 of this embodiment is similar to that of FIG. 4A. In this embodiment, the first switching circuit 126 of the first DC/DC switching conversion circuit 1251 is turned on, and the second switching circuit 127 of the first DC/DC switching conversion circuit 1251 is turned off. That is, the first DC/DC switching conversion circuit 1251 is bypassed. Under this circumstance, the ratio of the input voltage to the output voltage of the second conversion unit 123 is 2:1. Alternatively, the first switching circuit 126 of the second DC/DC switching conversion circuit 1252 is turned on, and the second switching circuit 127 of the second DC/DC switching conversion circuit 1252 is turned off. That is, the second DC/DC switching conversion circuit 1252 is bypassed. Under this circumstance, the ratio of the input voltage to the output voltage of the second conversion unit 123 is also 2:1.

Figure 4C:
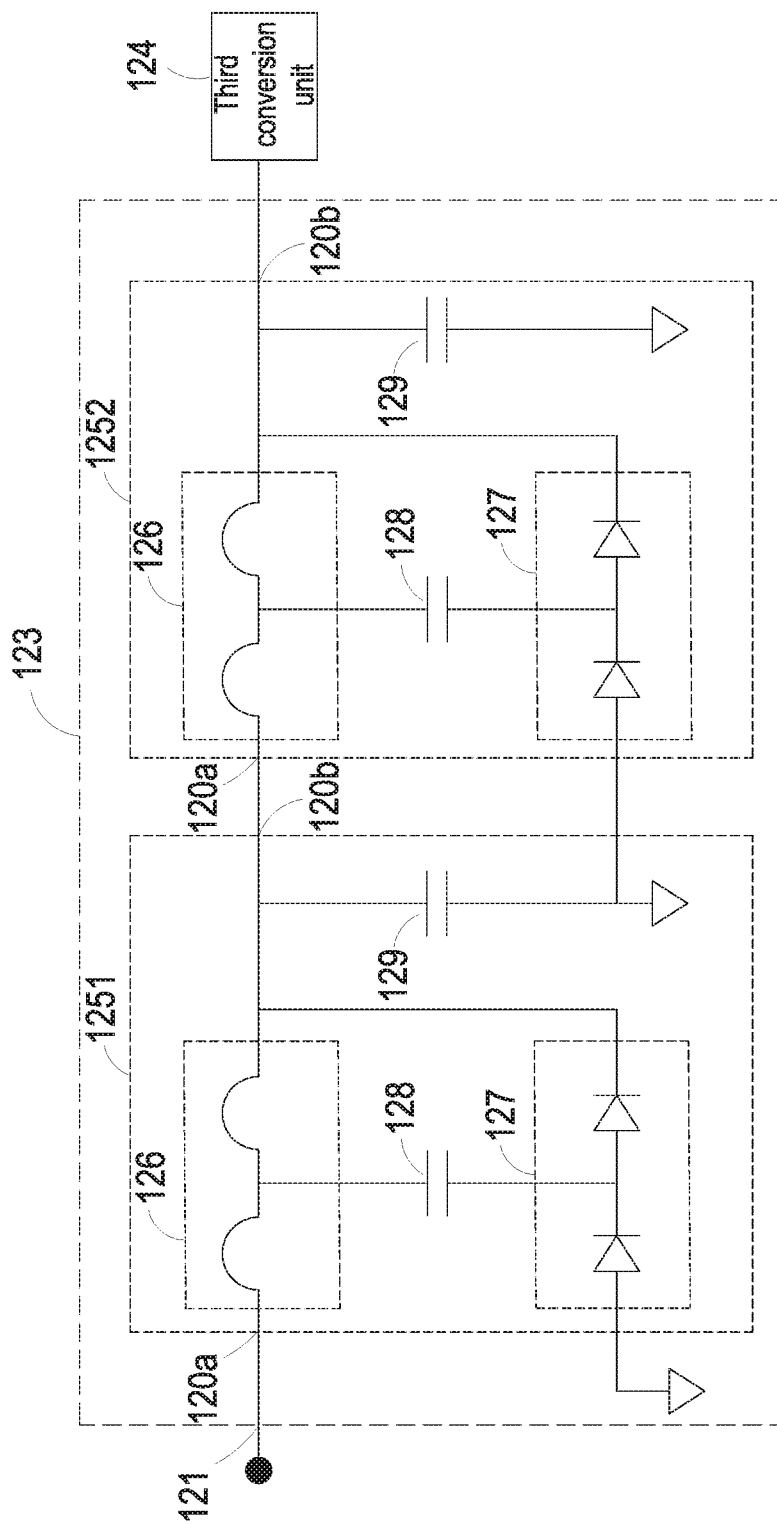
FIG. 4C is a schematic circuit diagram illustrating the second conversion unit as shown in FIG. 4A, in which the ratio of the input voltage to the output voltage of the second conversion unit is 1:1.

FIG. 4C is a schematic circuit diagram illustrating the second conversion unit as shown in FIG. 4A, in which the ratio of the input voltage to the output voltage of the second conversion unit is 1:1. The circuitry of the second conversion unit 123 of this embodiment is similar to that of FIG. 4A. In this embodiment, the first switching circuit 126 of the first DC/DC switching conversion circuit 1251 is turned on, and the second switching circuit 127 of the first DC/DC switching conversion circuit 1251 is turned off. Moreover, the first switching circuit 126 of the second DC/DC switching conversion circuit 1252 is turned on, and the second switching circuit 127 of the second DC/DC switching conversion circuit 1252 is turned off. That is, the first DC/DC switching conversion circuit 1251 and the second DC/DC switching conversion circuit 1252 are bypassed. Under this circumstance, the ratio of the input voltage to the output voltage of the second conversion unit 123 is 1:1.

Hereinafter, the operations of the power device 1 will be described with reference to FIGS. 5, 6, 7, 8 and FIGS. 4A, 4B and 4C. For example, the ratio of the input voltage to the output voltage of the first DC/DC switching conversion circuit 1251 is 2:1, and the ratio of the input voltage to the output voltage of the second DC/DC switching conversion circuit 1252 is 2:1. Under this circumstance, the possible ratio of the input voltage to the output voltage of the second conversion unit 123 is 1:1, 1:2 or 4:1. As mentioned above, the ratio of the input voltage to the output voltage of the first conversion unit 113 is fixed, and the output voltage of the first conversion unit 113 stably maintained at the proper voltage level. Consequently, the first divided voltage U1 received by the first conversion unit 113 is kept unchanged. It is assumed that the output voltage Uo is stably maintained at 1V and the ratio of the input voltage to the output voltage of the first conversion unit 113 is 36:1. That is, the first divided voltage U1 received by the first conversion unit 113 is 36V. In case that the bus voltage is in the range between 40V and 60V, so the second divided voltage U2 received by the second conversion unit 123 is in the range between 4V and 24V.

Figure 5:
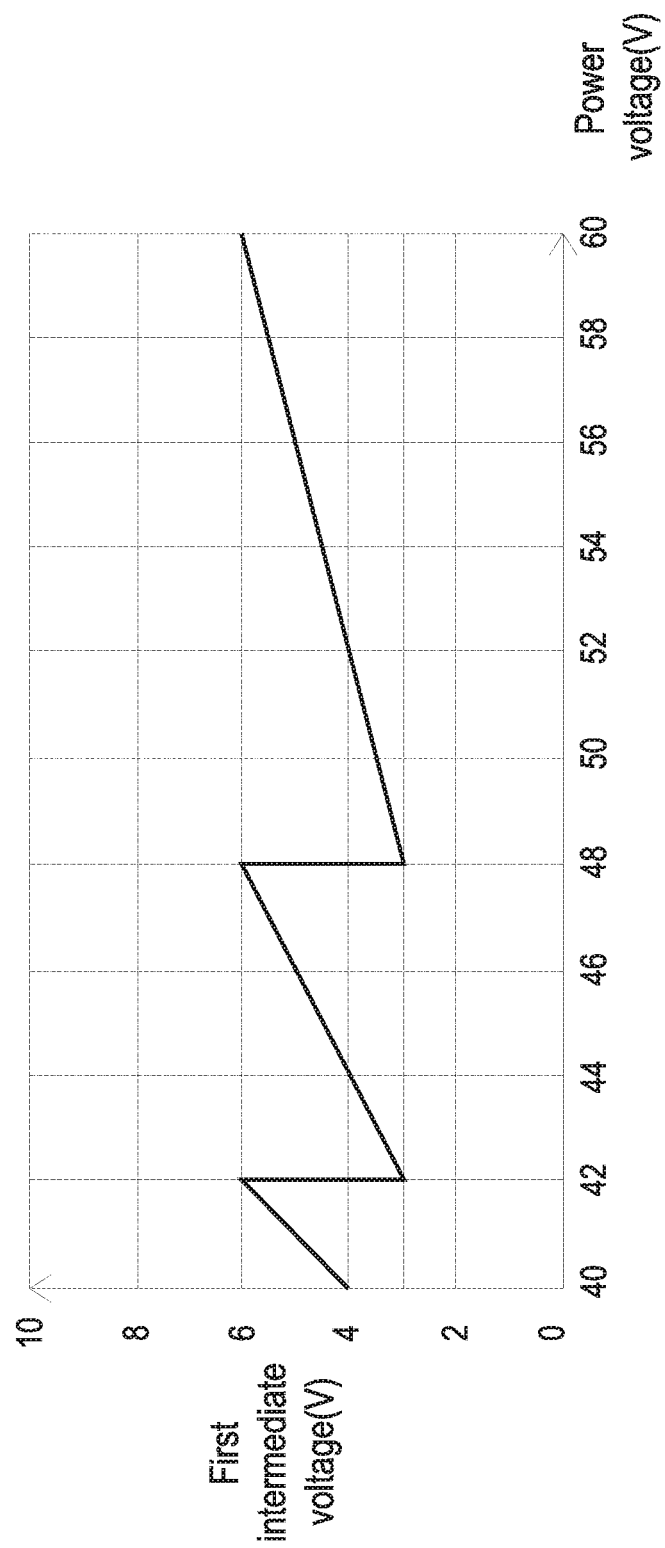
FIG. 5 is a plot illustrating the relationship between the bus voltage and the first intermediate voltage.
Figure 6:
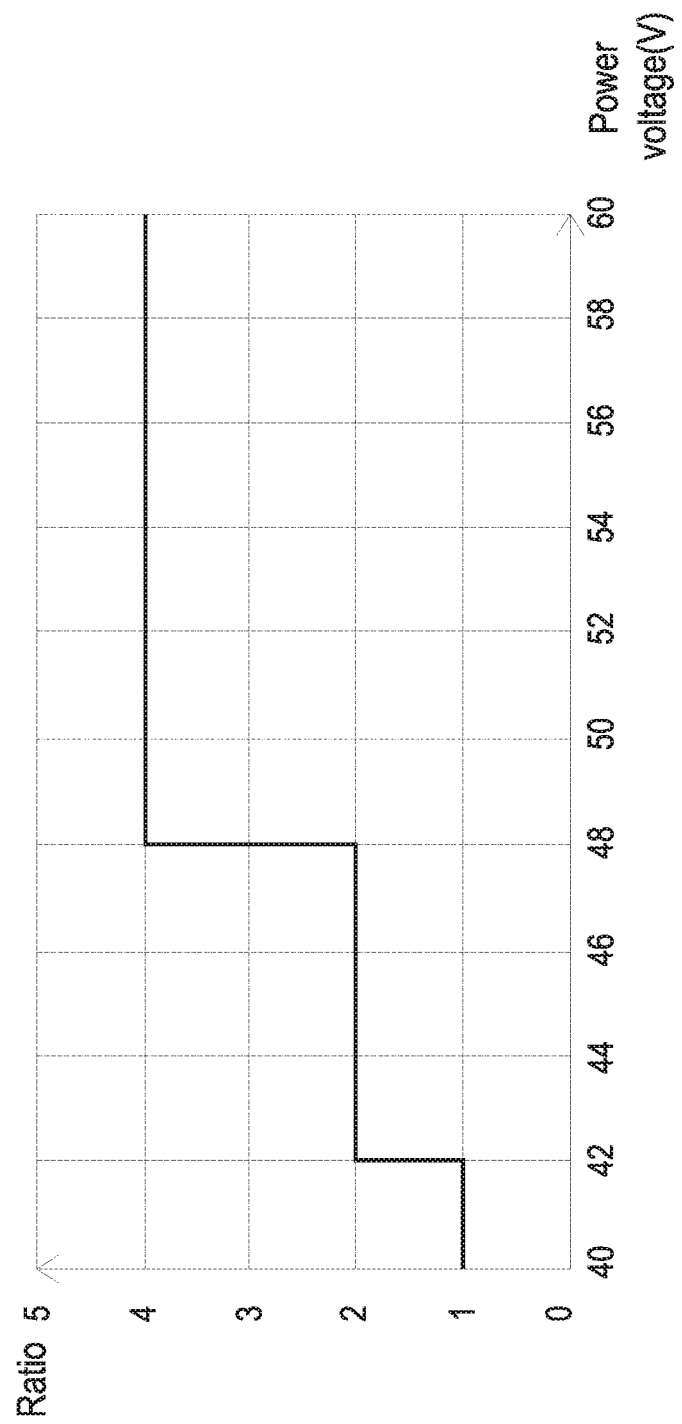
FIG. 6 is a plot illustrating the relationship between the bus voltage and the ratio of the input voltage to the output voltage of the second conversion unit.
Figure 7:
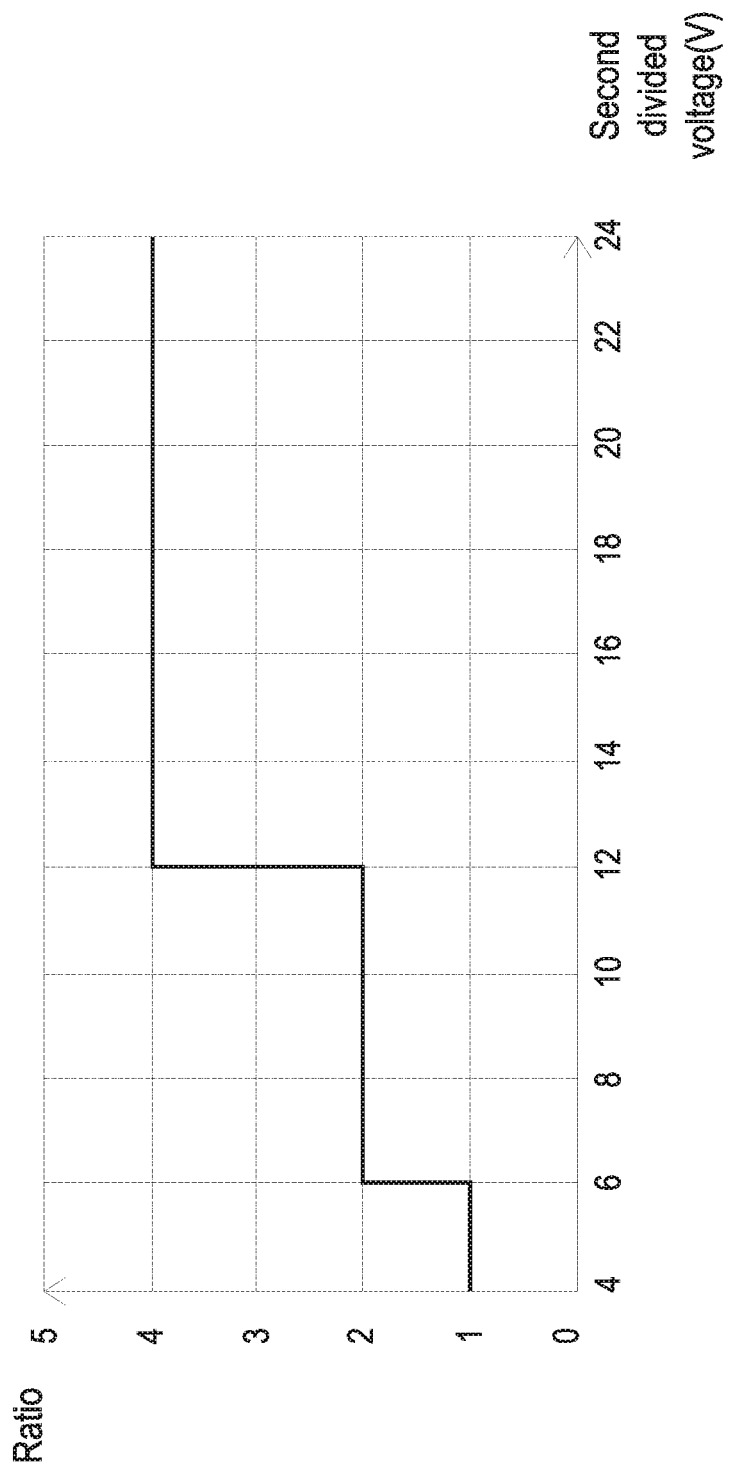
FIG. 7 is a plot illustrating the relationship between the first divided voltage of the bus voltage and the ratio of the input voltage to the output voltage of the second conversion unit.

As shown in FIG. 5-7, in a first situation, the bus voltage is in the range between 40V and 42V. The second divided voltage U2 of the bus voltage is provided to the second conversion unit 123, and the second divided voltage U2 received by the second conversion unit 123 is in the range between 4V and 6V. Moreover, the first DC/DC switching conversion circuit 1251 and the second DC/DC switching conversion circuit 1252 may be bypassed (see FIG. 4C). Under this circumstance, the ratio of the input voltage to the output voltage of the second conversion unit 123 is 1:1. Consequently, the output voltage of the second conversion unit 123 (i.e., the first intermediate voltage Uib1) is in the range between 4V and 6V.

In a second situation, the bus voltage is in the range between 42V and 48V. The second divided voltage U2 of the bus voltage is provided to the second conversion unit 123, and the second divided voltage U2 received by the second conversion unit 123 is in the range between 6V and 12V. Moreover, just the first DC/DC switching conversion circuit 1251 may be bypassed (see FIG. 4B). Under this circumstance, the ratio of the input voltage to the output voltage of the second conversion unit 123 is 2:1. Consequently, the output voltage of the second conversion unit 123 (i.e., the first intermediate voltage Uib1) is in the range between 3V and 6V.

In a third situation, the bus voltage is in the range between 48V and 60V. The second divided voltage U2 of the bus voltage is provided to the second conversion unit 123, and the second divided voltage U2 received by the second conversion unit 123 is in the range between 12V and 24V. Moreover, the first DC/DC switching conversion circuit 1251 and the second DC/DC switching conversion circuit 1252 are not bypassed (see FIG. 4A). Under this circumstance, the ratio of the input voltage to the output voltage of the second conversion unit 123 is 4:1. Consequently, the output voltage of the second conversion unit 123 (i.e., the first intermediate voltage Uib1) is in the range between 3V and 6V.

As the bus voltage undergoes fluctuation, the ratio of the input voltage to the output voltage of the second conversion unit 123 is adjusted according to the bus voltage or the second divided voltage U2. Consequently, the output voltage of the second conversion unit 123 (i.e., the first intermediate voltage Uib1) is limited to be in the range between 3V and 6V (i.e., the predetermined voltage range).

Figure 8:
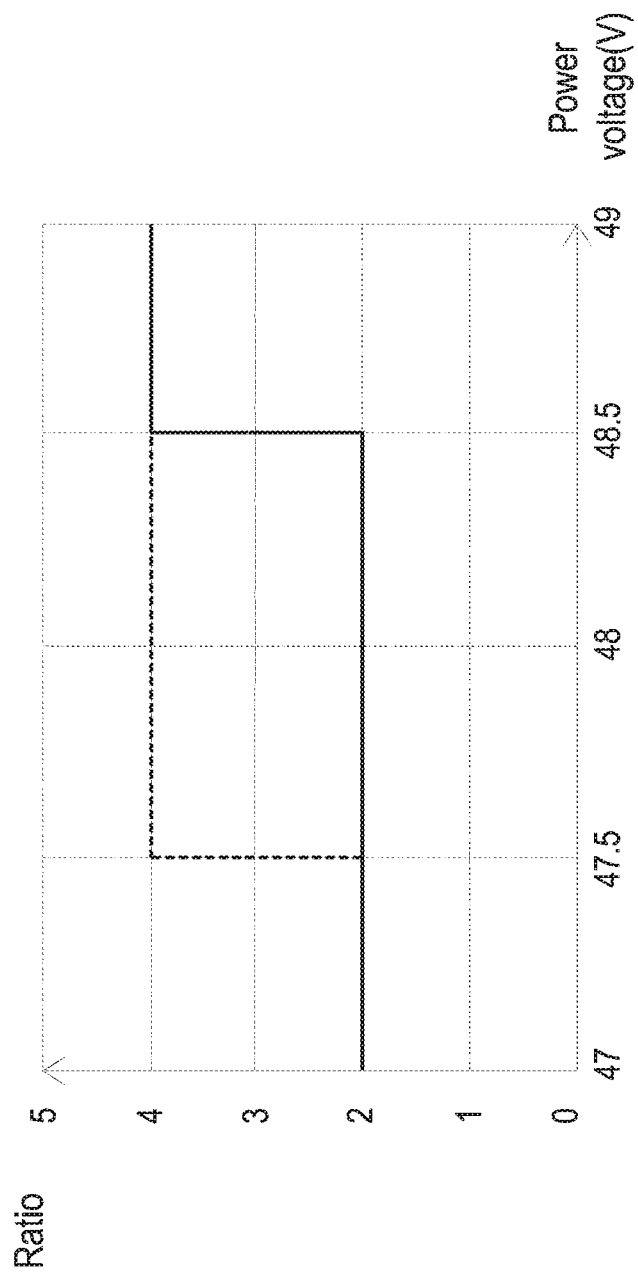
FIG. 8 schematically illustrating a way of adjusting the ratio of the input voltage to the output voltage of the second conversion unit according to the bus voltage.

FIG. 8 schematically illustrating a way of adjusting the ratio of the input voltage to the output voltage of the second conversion unit according to the bus voltage. As shown in FIG. 8, the bus voltage is about 48V, and the hysteresis width is 1V. As the bus voltage is increased from the level lower than 48.5V to 48.5V, the ratio of the input voltage to the output voltage of the second conversion unit 123 is changed from 2 to 4. As the bus voltage is decreased from the level higher than 47.5V to 47.5V, the ratio of the input voltage to the output voltage of the second conversion unit 123 is changed from 4 to 2. In this embodiment, the ratio of the input voltage to the output voltage of the second conversion unit 123 is adjusted according to the hysteresis loop. Consequently, the ratio adjustment is not adversely affected by the high frequency noise of the bus voltage.

Figure 9:
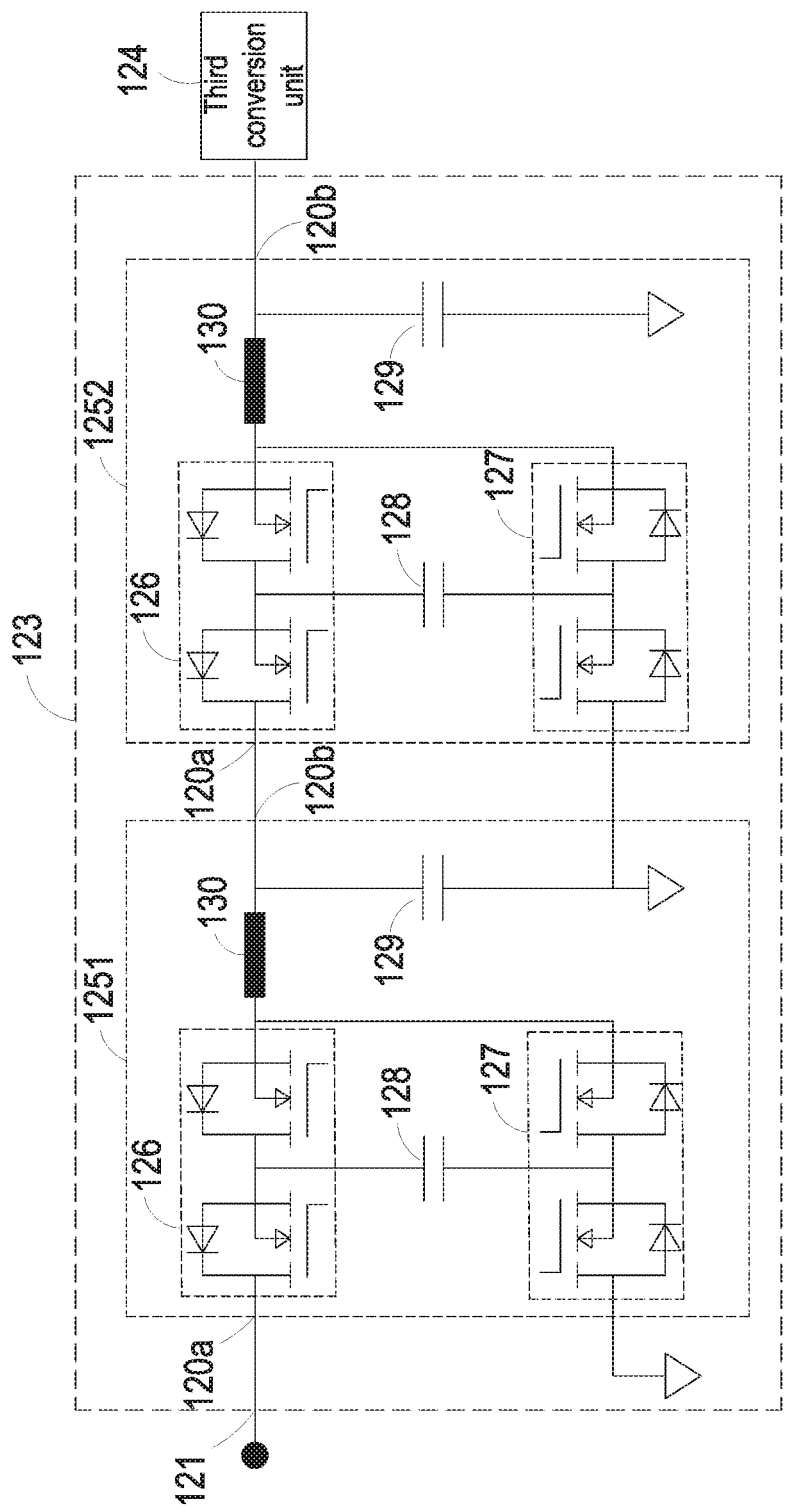
FIG. 9 is a schematic circuit diagram illustrating another exemplary second conversion unit with plural DC/DC switching conversion circuits.

FIG. 9 is a schematic circuit diagram illustrating another exemplary second conversion unit with plural DC/DC switching conversion circuits. As shown in FIG. 9, the second conversion unit 123 comprises a first DC/DC switching conversion circuit 1251 and a second DC/DC switching conversion circuit 1252 in cascade connection. Each of the DC/DC switching conversion circuits 1251 and 1252 comprises an input terminal 120a, an output terminal 120b, a first switching circuit 126, a second switching circuit 127, a first capacitor 128, a second capacitor 129 and an inductor 130. The output terminal 120b of the first DC/DC switching conversion circuit 1251 is electrically connected with the input terminal 120a of the second DC/DC switching conversion circuit 1252. The first terminal of the first switching circuit 126 is electrically connected with the corresponding input terminal 120a. The first terminal of the second switching circuit 127 is electrically connected with the ground terminal. The first capacitor 128 is electrically connected between the middle point of the corresponding first switching circuit 126 and the middle point of the corresponding second switching circuit 127. The first terminal of the inductor 130 is electrically connected with the second terminal of the corresponding first switching circuit 126 and the second terminal of the corresponding second switching circuit 127. The second terminal of the inductor 130 is electrically connected with the corresponding output terminal 120b and the first terminal of the second capacitor 129. The second terminal of the second capacitor 129 is electrically connected with the ground terminal. The method of adjusting the ratio of the input voltage to the output voltage of the second conversion unit 123 is similar to that of FIGS. 4A, 4B and 4C, and is not redundantly described herein.

Figure 10:
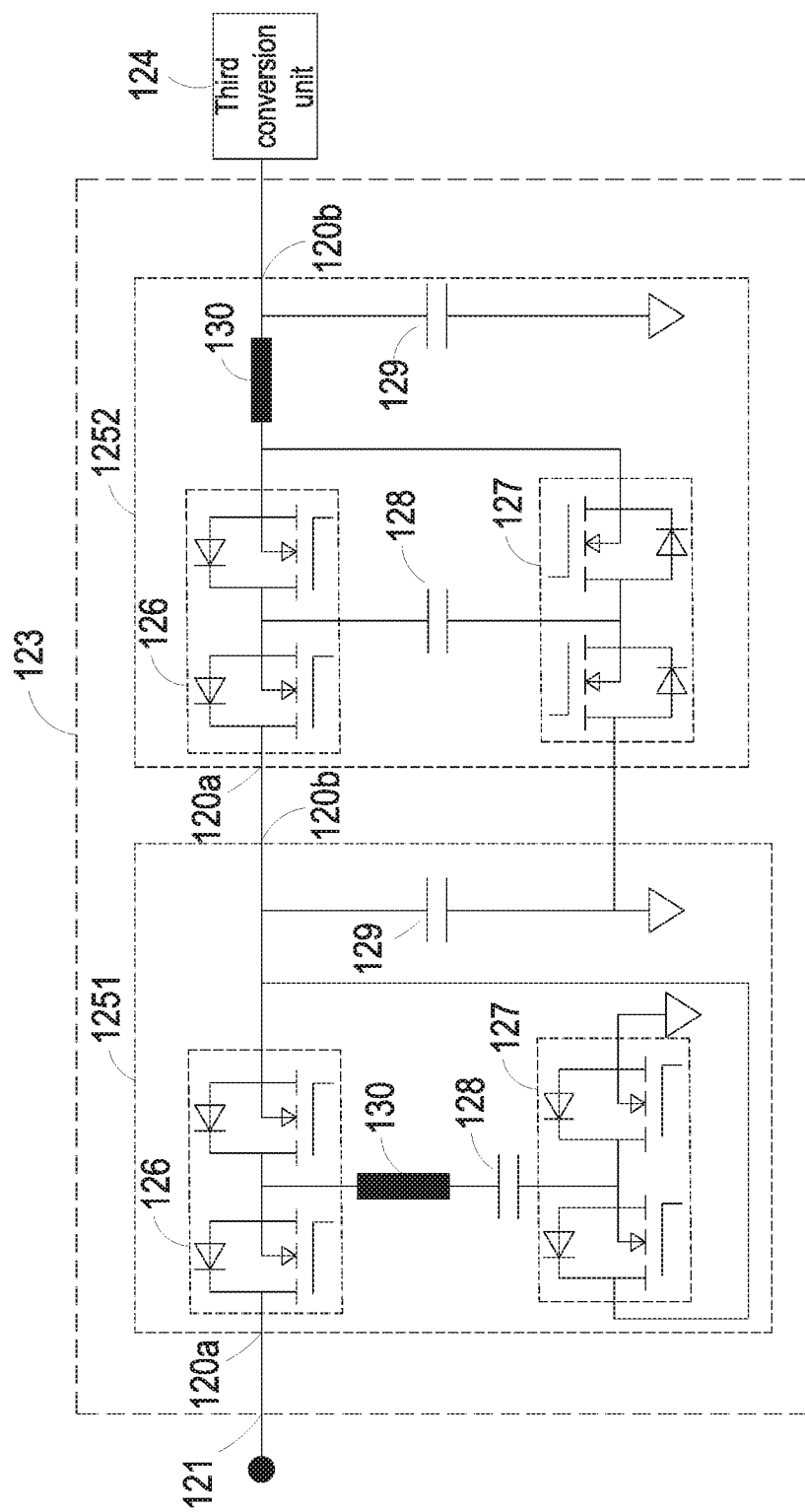
FIG. 10 is a schematic circuit diagram illustrating a further exemplary second conversion unit with plural DC/DC switching conversion circuits.

FIG. 10 is a schematic circuit diagram illustrating a further exemplary second conversion unit with plural DC/DC switching conversion circuits. As shown in FIG. 10, the second conversion unit 123 comprises two DC/DC switching conversion circuit. In this embodiment, the second conversion unit 123 comprises a first DC/DC switching conversion circuit 1251 and a second DC/DC switching conversion circuit 1252 in cascade connection. For example, each of the DC/DC switching conversion circuits 1251 and 1252 is a SC-DCX circuit or a STC-DCX circuit. In this embodiment, the first DC/DC switching conversion circuit 1251 is the STC-DCX circuit, and the second DC/DC switching conversion circuit 1252 is the SC-DCX circuit. Each of the DC/DC switching conversion circuits 1251 and 1252 comprises an input terminal 120a, an output terminal 120b, a first switching circuit 126, a second switching circuit 127, a first capacitor 128, a second capacitor 129 and an inductor 130. The first terminal of the first switching circuit 126 of the first DC/DC switching conversion circuit 1251 is electrically connected with the input terminal 120a of the first DC/DC switching conversion circuit 1251. The second terminal of the second switching circuit 127 of the first DC/DC switching conversion circuit 1251 is electrically connected with the ground terminal. The first capacitor 128 and the inductor 130 of the first DC/DC switching conversion circuit 1251 are serially connected between the middle point of the first switching circuit 126 and the middle point of the second switching circuit 127. In the first DC/DC switching conversion circuit 1251, the first terminal of the second capacitor 129 is electrically connected with the second terminal of the first switching circuit 126 and the first terminal of the second switching circuit 127. The second terminal of the second capacitor 129 of the first DC/DC switching conversion circuit 1251 is electrically connected with the ground terminal. The first terminal of the first switching circuit 126 of the second DC/DC switching conversion circuit 1252 is electrically connected with the first terminal of the second capacitor 129 of the first DC/DC switching conversion circuit 1251. The first terminal of the second switching circuit 127 of the second DC/DC switching conversion circuit 1252 is electrically connected with the second capacitor 129 of the first DC/DC switching conversion circuit 1251 and connected with the ground terminal. The first capacitor 128 of the second DC/DC switching conversion circuit 1252 is electrically connected between the middle point of the first switching circuit 126 and the middle point of the second switching circuit 127. The first terminal of the inductor 130 of the second DC/DC switching conversion circuit 1252 is electrically connected with the second terminal of the corresponding first switching circuit 126 and the second terminal of the corresponding second switching circuit 127. The first terminal of the second capacitor 129 of the second DC/DC switching conversion circuit 1252 is electrically connected with the second terminal of the inductor 130. The second terminal of the second capacitor 129 of the second DC/DC switching conversion circuit 1252 is electrically connected with the ground terminal. The method of adjusting the ratio of the input voltage to the output voltage of the second conversion unit 123 is similar to that of FIGS. 4A, 4B and 4C, and is not redundantly described herein.

Figure 11:
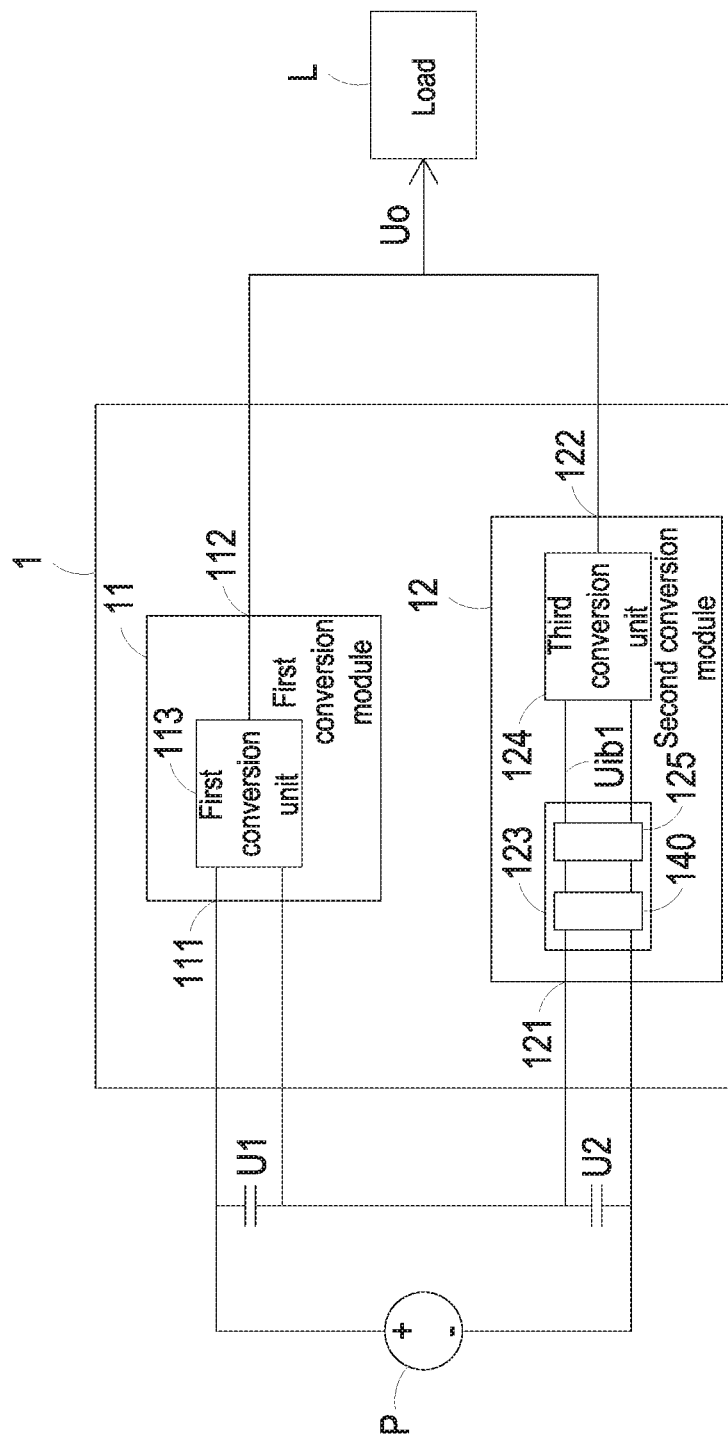
FIG. 11 is a schematic circuit diagram illustrating a power device according to a third embodiment of the present invention.

FIG. 11 is a schematic circuit diagram illustrating a power device according to a third embodiment of the present invention. Component parts and elements corresponding to those of the first embodiment are designated by identical numeral references, and detailed descriptions thereof are omitted. In this embodiment, the second conversion unit 123 comprises a DC/DC switching conversion circuit 125 and an isolated conversion circuit 140. The circuitry of the DC/DC switching conversion circuit 125 is for example, similar to that of FIG. 3, and is not redundantly described herein. The ratio of the input voltage to the output voltage of the isolated conversion circuit 140 is fixed. It is noted that the sequence of the DC/DC switching conversion circuit 125 and the isolated conversion circuit 140 is not restricted. In this embodiment, the isolated conversion circuit 140 is electrically connected between the power source P and the DC/DC switching conversion circuit 125. The isolated conversion circuit 140 receives the second divided voltage U2 of the bus voltage. By the isolated conversion circuit 140, the second divided voltage U2 is converted into a transition voltage. The transition voltage is transmitted to the DC/DC switching conversion circuit 125. Then the transition voltage is converted into the first intermediate voltage by the DC/DC switching conversion circuit 125. The isolated conversion circuit 140 of the second conversion unit 123 is used for providing electrical isolation.

From the above descriptions, the second conversion module of the power device includes a second conversion unit and a third conversion unit, which are connected with each other in cascade. The ratio of the input voltage to the output voltage of the second conversion unit is adjustable. As the bus voltage (or the second divided voltage) undergoes fluctuation, the ratio of the input voltage to the output voltage of the second conversion unit is adjusted. Consequently, the output voltage of the second conversion unit or the input voltage of the third conversion unit (i.e., the first intermediate voltage) is limited to be in the predetermined voltage range. Consequently, the efficiency of the second conversion module is not decreased with the increase of the second divided voltage. In accordance with the present invention, the overall efficiency of the power device is kept high when the bus voltage from the power source is subjected to fluctuation. According to the ratio of the input voltage to the output voltage of the second conversion unit, the first intermediate voltage from the second conversion unit is adjustable. Consequently, the magnitude of the first intermediate voltage is limited to be within a predetermined voltage range between the minimum voltage value and the maximum voltage value. Since the magnitude of the first intermediate voltage is limited to be lower than the maximum voltage value, the cost-effective electronic components capable of withstanding the lower voltage can be used in the third conversion unit. And, the second conversion module and the power device may achieve higher efficiency. Since the magnitude of the first intermediate voltage is limited to be higher than the minimum voltage value, the first intermediate voltage is not lower than the threshold voltage of the under voltage-lockout (UVLO) function. Consequently, the safety and the stability of the power device are enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power device for receiving a bus voltage and providing an output voltage to a load, the power device comprising:
   a first conversion module comprising an input terminal, an output terminal and at least a first conversion unit, wherein the first conversion unit receives a first divided voltage of the bus voltage; and
   a second conversion module comprising an input terminal, an output terminal and a cascade conversion circuit with at least one second conversion unit and at least one third conversion unit;
   wherein the input terminal of the second conversion module and the input terminal of the first conversion module are connected with each other in series, the input terminal of the second conversion module receives a second divided voltage of the bus voltage, and the output terminal of the second conversion module and the output terminal of the first conversion module are electrically connected with each other in parallel so as to provide the output voltage to the load, wherein the third conversion unit detects the output voltage in real time to control the output voltage stable, wherein a first voltage is converted into a second voltage by the second conversion unit, wherein a second ratio of a input voltage to a output voltage of the first conversion unit is fixed, wherein the bus voltage comprises plural intervals, each of the plural intervals has a start voltage and a terminal voltage, the start voltage of each of the plural intervals is equal to the terminal voltage of a previous interval of the plural intervals, wherein a first ratio of the first voltage to the second voltage is adjustable discontinuously between two adjacent intervals of the plural intervals, the first ratio of the first voltage to the second voltage is different between the two adjacent intervals of the plural intervals through increasing of the bus voltage, a first magnitude of each of the plural intervals is greater than a second magnitude of the previous interval of the plural intervals through increasing of the bus voltage.

2. The power device according to claim 1, wherein the first ratio of the first voltage to the second voltage is adjusted according to the bus voltage.

3. The power device according to claim 1, wherein the first ratio of the first voltage to the second voltage is adjusted according to the second divided voltage of the bus voltage.

4. The power device according to claim 1, wherein the first voltage is the second divided voltage of the bus voltage, and the second voltage is a first intermediate voltage, wherein the first intermediate voltage is converted into the output voltage by the third conversion unit.

5. The power device according to claim 4, wherein a magnitude of the first intermediate voltage is limited to be within a predetermined voltage range by adjusting the first ratio of the first voltage to the second voltage.

6. The power device according to claim 1, wherein the second divided voltage of the bus voltage is converted into a second intermediate voltage by the third conversion unit, wherein the first voltage is the second intermediate voltage, and the second voltage is the output voltage.

7. The power device according to claim 1, wherein the second conversion unit comprises a DC/DC switching conversion circuit which is single type.

8. The power device according to claim 7, wherein the DC/DC switching conversion circuit is a Switching Tank Converter DC-DC Transformer (STC-DCX) circuit.

9. The power device according to claim 7, wherein the second conversion unit further comprises an isolated conversion circuit, wherein the second divided voltage of the bus voltage is converted into a transition voltage by the isolated conversion circuit, and the transition voltage is transmitted to the DC/DC switching conversion circuit.

10. The power device according to claim 1, wherein the second conversion unit comprises plural DC/DC switching conversion circuits, which are connected in cascade.

11. The power device according to claim 10, wherein the plural DC/DC switching conversion circuits are Switching Capacitor DC-DC Transformer (SC-DCX) circuits or STC-DCX circuits.

12. The power device according to claim 10, wherein the first ratio of the first voltage to the second voltage of the second conversion unit is adjustable by bypassing at least one of the plural DC/DC switching conversion circuits.

13. The power device according to claim 10, wherein each of the plural DC/DC switching conversion circuits comprises an input terminal, an output terminal, a first switching circuit, a second switching circuit, a first capacitor and a second capacitor, wherein a first terminal of the first switching circuit is electrically connected with the input terminal of a corresponding DC/DC switching conversion circuit of the plural DC/DC switching conversion circuits, a first terminal of the second switching circuit is electrically connected with a ground terminal, the first capacitor is electrically connected between a middle point of the corresponding first switching circuit and a middle point of the corresponding second switching circuit, a first terminal of the second capacitor, a second terminal of the first switching circuit and a second terminal of the second switching circuit are electrically connected with the output terminal of the corresponding DC/DC switching conversion circuit of the plural DC/DC switching conversion circuits, and a second terminal of the second capacitor is electrically connected with the ground terminal.

14. The power device according to claim 10, wherein each of the plural DC/DC switching conversion circuits comprises an input terminal, an output terminal, a first switching circuit, a second switching circuit, a first capacitor, a second capacitor and an inductor, wherein a first terminal of the first switching circuit is electrically connected with the input terminal of a corresponding DC/DC switching conversion circuit of the plural DC/DC switching conversion circuits, a first terminal of the second switching circuit is electrically connected with a ground terminal, the first capacitor is electrically connected between a middle point of the corresponding first switching circuit and a middle point of the corresponding second switching circuit, a first terminal of the inductor is electrically connected with a second terminal of the corresponding first switching circuit and a second terminal of the corresponding second switching circuit, a second terminal of the inductor is electrically connected with the output terminal of the corresponding DC/DC switching conversion circuit of the plural DC/DC switching conversion circuits and a first terminal of the second capacitor, and a second terminal of the second capacitor is electrically connected with the ground terminal.

15. The power device according to claim 10, wherein the plural DC/DC switching conversion circuits comprises a first DC/DC switching conversion circuit and a second DC/DC switching conversion circuit, and each of the first DC/DC switching conversion circuit and the second DC/DC switching conversion circuit comprises a first switching circuit, a second switching circuit, a first capacitor, a second capacitor and an inductor, wherein a first terminal of the first switching circuit of the first DC/DC switching conversion circuit is electrically connected with the input terminal of the first DC/DC switching conversion circuit, a second terminal of the second switching circuit of the first DC/DC switching conversion circuit is electrically connected with a ground terminal, the first capacitor of the first DC/DC switching conversion circuit and the inductor of the first DC/DC switching conversion circuit are serially connected between a middle point of the first switching circuit of the first DC/DC switching conversion circuit and a middle point of the second switching circuit of the first DC/DC switching conversion circuit, a first terminal of the second capacitor of the first DC/DC switching conversion circuit is electrically connected with a second terminal of the first switching circuit of the first DC/DC switching conversion circuit and a first terminal of the second switching circuit of the first DC/DC switching conversion circuit, a second terminal of the second capacitor of the first DC/DC switching conversion circuit is electrically connected with the ground terminal, a first terminal of the second switching circuit of the second DC/DC switching conversion circuit is connected with the ground terminal, the first capacitor of the second DC/DC switching conversion circuit is electrically connected between a middle point of the first switching circuit of the second DC/DC switching conversion circuit and a middle point of the second switching circuit of the second DC/DC switching conversion circuit, a first terminal of the inductor of the second DC/DC switching conversion circuit is electrically connected with a second terminal of the first switching circuit of the second DC/DC switching conversion circuit and a second terminal of the second switching circuit of the second DC/DC switching conversion circuit, a first terminal of the second capacitor of the second DC/DC switching conversion circuit is electrically connected with a second terminal of the inductor of the second DC/DC switching conversion circuit, and a second terminal of the second capacitor of the second DC/DC switching conversion circuit is electrically connected with the ground terminal.

16. The power device according to claim 10, wherein the second conversion unit further comprises an isolated conversion circuit, wherein the second divided voltage of the bus voltage is converted into a transition voltage by the isolated conversion circuit, and the transition voltage is transmitted to a first DC/DC switching conversion circuit of the plural DC/DC switching conversion circuits.

17. The power device according to claim 1, wherein the first conversion unit comprises a LLC DC transformer, a phase-shifted full-bridge DC converter, a buck/boost transformer, or plural parallel-connected LLC DC transformers.

18. The power device according to claim 1, wherein the third conversion unit comprises a single buck converter or plural parallel-connected buck converters.

19. The power device according to claim 1, wherein the first ratio is fixed in each of the plural intervals.

* * * * *